(12) United States Patent
Koehler et al.

(10) Patent No.: US 7,202,467 B2
(45) Date of Patent: Apr. 10, 2007

(54) SYSTEM FOR THE OPTICAL DETECTION OF A DISTANT OBJECT USING A ROTATING MIRROR

(75) Inventors: Jess Koehler, Immenstaad (DE); Wolfgang Holota, Otterloh (DE)

(73) Assignee: EADS Astrium GmbH, Munich (DE)

( * ) Notice: Subject to any disclaimer, the term of this patent is extended or adjusted under 35 U.S.C. 154(b) by 178 days.

(21) Appl. No.: 10/979,167

(22) Filed: Nov. 3, 2004

(65) Prior Publication Data

US 2005/0224702 A1     Oct. 13, 2005

(30) Foreign Application Priority Data

Nov. 5, 2003   (DE) ................ 103 51 714

(51) Int. Cl.
*G01B 11/00* (2006.01)
(52) U.S. Cl. ............ 250/221; 356/629; 250/234
(58) Field of Classification Search .......... 250/221, 250/235, 234, 559.13; 359/204; 356/4.01, 356/141.1; 180/167
See application file for complete search history.

(56) References Cited

U.S. PATENT DOCUMENTS 5,371,581 A   12/1994  Wangler et al.
5,848,188 A   12/1998  Shibata et al.
6,075,636 A    6/2000  Sekikawa
6,647,919 B2 * 11/2003  Vijverberg ............... 119/14.08

FOREIGN PATENT DOCUMENTS

DE   197 13 826 A1   10/1997
DE   101 39 237 A1    3/2003

* cited by examiner

*Primary Examiner*—Thanh X. Luu
*Assistant Examiner*—Tony Ko
(74) *Attorney, Agent, or Firm*—Crowell & Moring LLP

(57) ABSTRACT

A system is described for the optical detection of a distant object, having a light beam generating device for generating a parallel light beam, a scanning unit for generating a scan pattern by deflecting the parallel light beam over a defined angular range, and a detector unit for detecting light reflected by the distant object. The scanning unit includes a rotating polygonal mirror with several reflecting partial mirror surfaces. The light beam generating device is provided for generating a parallel light beam in two different beam positions which, in response to a rotating position indicating signal indicating the rotating position of the polygonal mirror, can be switched over from a partial mirror surface to an adjacent partial mirror surface. Accordingly, a system is provided for the optical direction of a distant object, which system has a high capacity. In particular, the system permits the optical detection of distant objects, such as poorly recognizable obstacles, in the air space in the flight direction in front of an aircraft.

17 Claims, 3 Drawing Sheets

SYSTEM FOR THE OPTICAL DETECTION OF A DISTANT OBJECT USING A ROTATING MIRROR

This application claims the benefit of priority under 35 U.S.C. § 119 to German Patent Application No. 103 51 714.6, filed Nov. 5, 2003, the entire disclosure of which is herein expressly incorporated by reference.

BACKGROUND OF THE INVENTION

The invention relates to a system for the optical detection of a distant object.

Systems for the optical detection of an object are known, for example, from German Patent Documents DE 101 39 237 A1 and DE 197 13 826 A1 and from U.S. patent Document U.S. Pat. No. 6,075,636 respectively. A light-beam generating device for generating a parallel light beam, a scanning unit for generating a scan pattern by deflecting the parallel light beam over a defined angular range, and a detector unit for detecting the light reflected by the object are provided in these documents. In this case, the scanning unit contains a rotating polygonal mirror with several reflecting partial mirror surfaces.

The present invention relates to a system for the optical detection of a remote object for monitoring the air space situated in the flight direction in front of an aircraft, such as a helicopter, with respect to poorly recognizable obstacles, such as overhead lines or wire cables. In order to detect poorly recognizable and therefore poorly reflecting objects over distances of a typical magnitude of 500 m in this application, the light energy delivered by the scanning unit cannot be distributed over the entire defined angular range but has to be kept as compact as possible and should have the highest possible intensity.

When a rotating polygonal mirror is used, the problem arises that, during each impingement upon an edge separating two adjacent partial mirror surfaces, the light beam is split into two parts which leave the scanning unit in two different directions. This leads to a considerable reduction of the intensity of the emitted parallel light beam. Although the relative effect of this loss can be reduced by enlarging the diameter of the polygonal mirror compared with the diameter of the parallel light beam, this would result in very large polygonal mirrors which are difficult to handle.

It is an object of the invention to provide a system for the optical detection of a remote object which has a high capacity. In particular, the system is to permit the optical detection of remote objects, such as poorly recognizable obstacles in the air space in the flight direction in front of an aircraft.

As a result of the invention, a system is created for the optical detection of a remote object, having a light beam generating device for generating a parallel light beam, a scanning unit for generating a scan pattern by deflecting the parallel light beam over a defined angular range, and a detector unit for detecting light reflected by the remote object, the scanning unit containing a rotating polygonal mirror with several reflecting partial mirror surfaces. According to the invention, the light beam generating device for generating a parallel light beam is provided in two different beam positions which, in response to a rotating position indicating signal indicating the rotating position of the polygonal mirror, can be changed over from one partial mirror surface to an adjacent partial mirror surface.

The light beam generating device is preferably provided for generating a parallel light beam in two different beam positions mutually offset in parallel.

According to an embodiment of the invention, the light beam generating device can contain two light sources for generating the parallel light beam in the two different beam positions.

According to another embodiment of the invention, it is provided that the light beam generating device contains a light source, and that a beam position switching unit is provided between the light source and the scanning unit, for changing over the beam position of the parallel light beam from one partial mirror surface to an adjacent partial mirror surface in response to the rotating position indicating signal indicating the rotating position of the polygonal mirror.

According to an embodiment thereof, it is provided that the beam position switching unit has the following successively arranged in the beam path: A polarizer for generating polarized light of a defined polarization condition from the light emitted by the light source; a Pockels cell for changing over the polarization condition of the light emitted by the polarizer between a first polarization condition and a second polarization condition, as well as a first polarization beam splitter for scattering the light having the first polarization condition in a first beam position in which the parallel light beam impinges on the one partial mirror surface, and for scattering the light having the second polarization condition in a second beam position, in which the parallel light beam impinges on the adjacent partial mirror surface.

The polarizer preferably contains a second polarization beam splitter with a λ/2-plate connected on the output side, for generating the polarized light of a defined polarization condition.

The first polarization beam splitter preferably contains one λ/4-plate respectively in the beam path of the light having the first polarization condition and in the beam path of the light having the second polarization condition, for generating the parallel light beam by means of circularly polarized light.

According to an embodiment of the invention, it is provided that the scanning unit contains the rotating polygonal mirror for deflecting the parallel light beam in a first direction and, in addition, a swivelling mirror for deflecting the parallel light beam in a second direction.

Preferably, the polygonal mirror is provided for deflecting the parallel light beam in the horizontal direction, and the swivelling mirror is provided for deflecting the parallel light beam in the vertical direction.

The detector unit preferably contains a detector and a lens system provided for imaging the light reflected by the distant object on the detector.

The detector preferably is a site-resolving detector.

According to an embodiment of the invention, the detector is a one-dimensional detector.

According to an embodiment of the invention, it is provided that the detector has a spherical or cylindrical image area.

Preferably, a swivelling mirror is provided in the beam path of the light reflected by the distant object in front of the detection unit, for adapting the direction of the light received by the detector unit to the direction of the light emitted by the scanning unit.

Preferably, the swivelling mirror provided for adapting the direction of the light received by the detector unit to the direction of the light emitted by the scanning unit is the same swivelling mirror which is provided for deflecting the parallel light beam in the second direction.

According to an embodiment of the invention, the lens system of the detector unit is a lens system of the double Gauss type with high precision and luminous intensity.

The system according to the invention is preferably used for monitoring the air space situated in the flight direction in front of the aircraft with respect to poorly recognizable obstacles, such as overhead wires or wire cables.

Other objects, advantages and novel features of the present invention will become apparent from the following detailed description of the invention when considered in conjunction with the accompanying drawings.

BRIEF DESCRIPTION OF THE DRAWING FIGURES

In the following, an embodiment of the system according to the invention for the optical detection of a remote object will be explained by means of the drawing.

Figure 1:
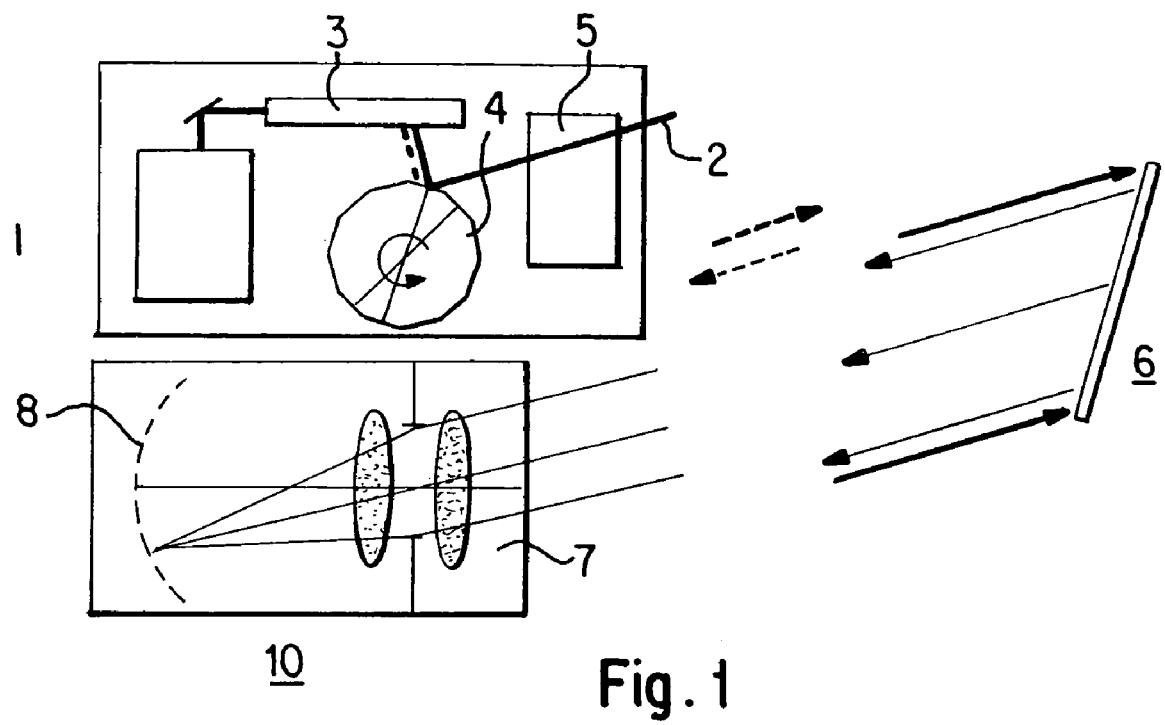
FIG. 1 is a schematic representation of the components of a system for the optical detection of a remote object, containing a transmitter part for delivering a parallel light beam deflected in a scan pattern and a receiver part for receiving light reflected or scattered by the object to be detected, according to an embodiment of the invention.
Figure 5:
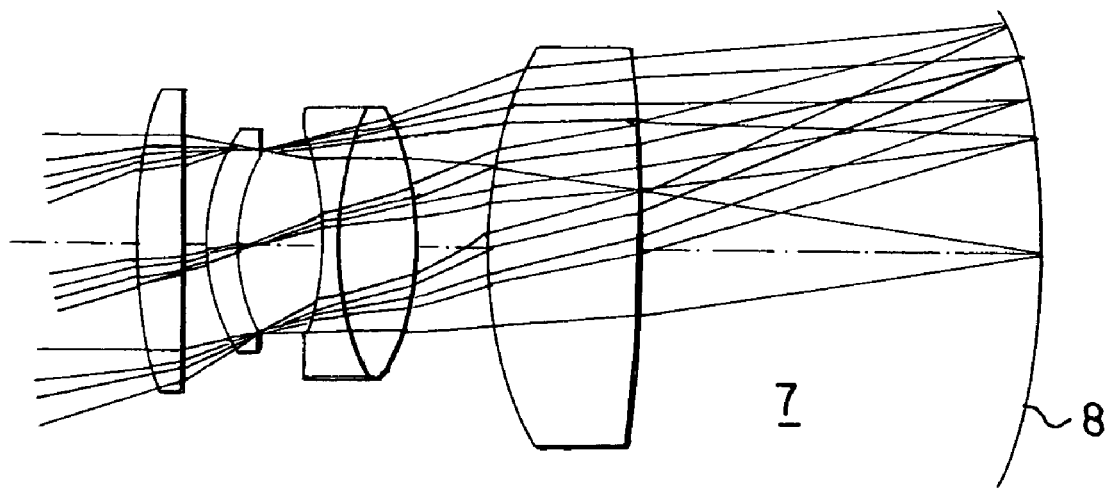
Figure 4A:
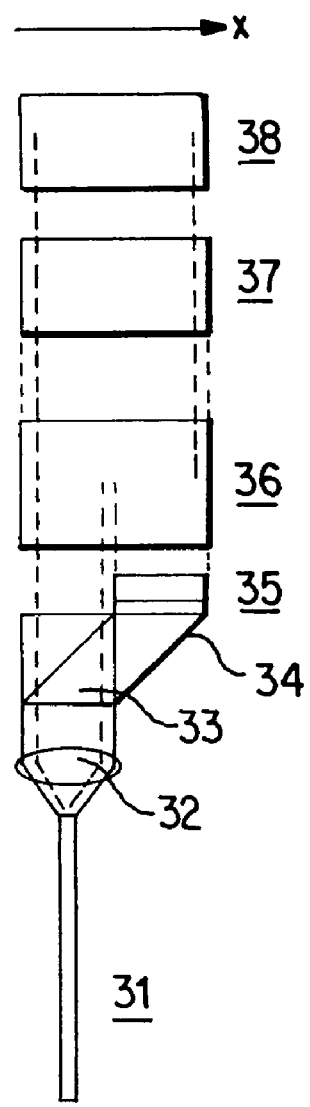
Figure 4B:
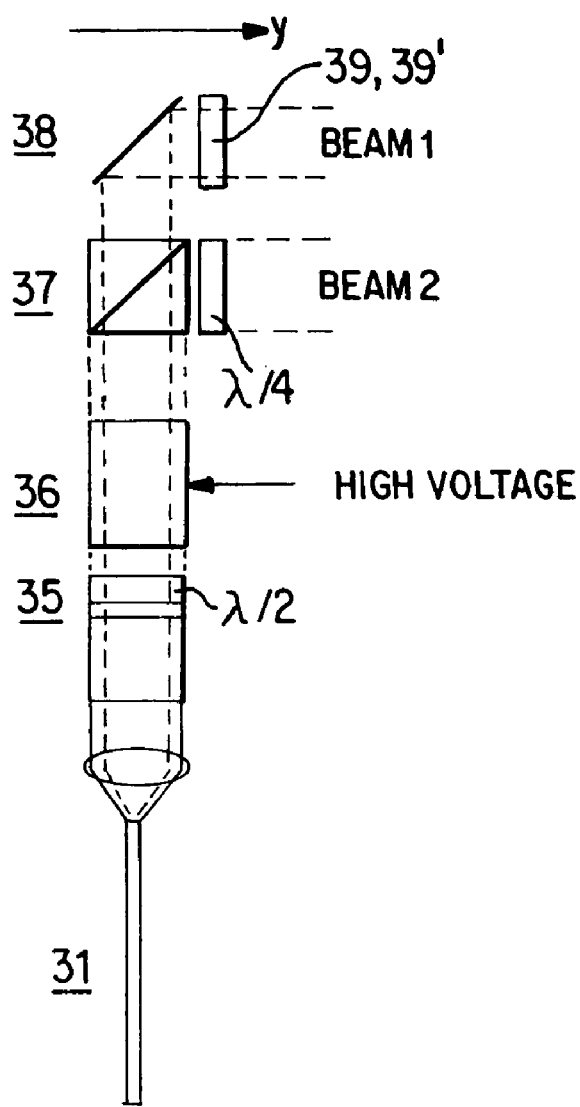

FIGS. 4a) and b) are a top view and a lateral view respectively of an embodiment of a beam position switching unit which, in the embodiment illustrated in FIG. 1, is provided for changing over the beam position of the parallel light beam emitted by the light beam generating unit; and FIG. 5 is a view of a lens system contained in the receiver part of the system according to the invention for detecting the light reflected by the object, which light guides an image onto a spherical or cylindrical image area while the luminous intensity is simultaneously high, according to an embodiment of the invention.

DETAILED DESCRIPTION

The system schematically illustrated in FIG. 1 and, as a whole, provided with the reference number 10 is used for the optical detection of a remote object 6, for example, of a poorly recognizable obstacle, such as an overhead line or a wire cable, in the air space which is situated in the flight direction in front of an aircraft, such as a helicopter.

The system 10 comprises a transmitter part which contains a beam generating device 1, 3 for generating a parallel light beam 2 and a scanning unit 4, 5 for generating a scan pattern by deflecting the parallel light beam 2 over a defined angular range, and a receiver part which is provided by a detector unit 7, 8 for detecting light reflected by the distant object. As illustrated in FIG. 1, the light, which is reflected or scattered by the distant object 6, is received by the detector unit 7, 8 from the same direction in which the parallel light beam 2 is emitted by the scanning unit 4, 5.

Figure 2:
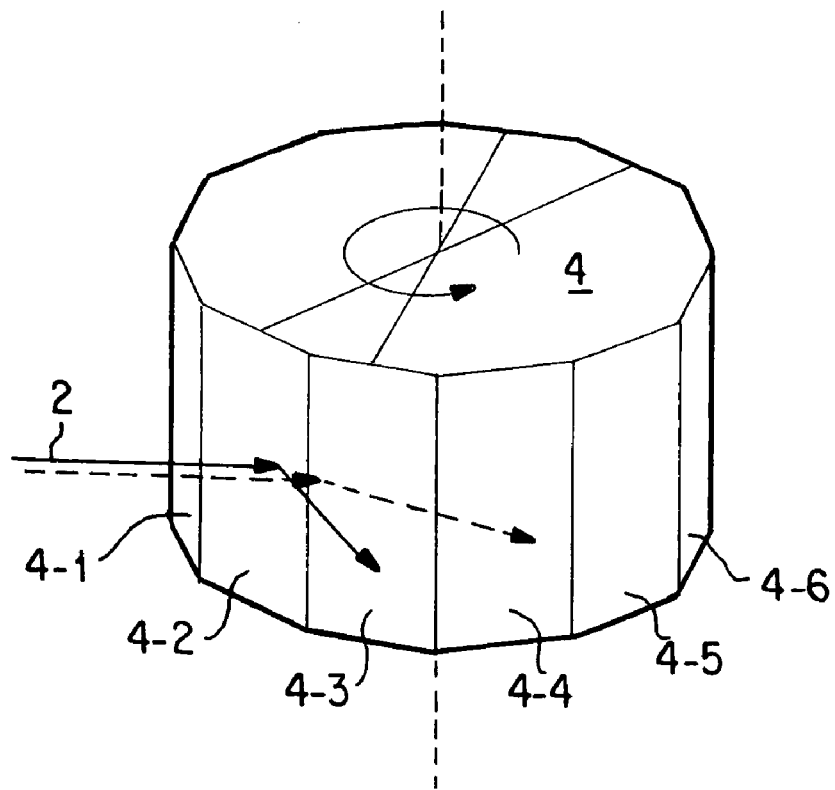
FIG. 2 is a perspective representation of a polygonal mirror which is a component of the system illustrated in FIG. 1.

The scanning unit 4, 5 contains a rotating polygonal mirror 4 with a number of reflecting partial mirror surfaces 4-1, 4-2, 4-3, . . . , as illustrated in detail in FIG. 2, which is provided for deflecting the parallel light beam 2 in a first direction, as well as, in the further course of the beam path, a swivelling mirror 5 for deflecting the parallel light beam 2 in a second direction. In the illustrated embodiment, the polygonal mirror 4 is used for deflecting the parallel light beam 2 in the horizontal direction, and the swivelling mirror 5 is used for deflecting the parallel light beam 2 in the vertical direction. Typically, the scanning unit 4, 5 carries out a scanning in an angular range of, for example, +/−20 degrees horizontally and +/−15 degrees vertically.

The light source 1 is preferably a pulsed high-powered laser operating in the infrared range. So that a detection of a poorly recognizable distant object can also be achieved in a reliable manner, the direction of the light pulses varies from one pulse to the next, so that an observation of the entire defined angular range can be carried out. The goal of the scanning operation is, for example, to scan the entire solid-angle range twice per second.

The light reflected by the distant object 6 is detected by the receiver-side detector unit 7, 8 which contains a detector 8 and a lens system 7 provided for imaging the light reflected by the distant object on the latter. The detector 8 is a one-dimensional site-resolving detector which, in the illustrated embodiment, has a spherical or cylindrical image area. The lens system 7 images the light beams reflected by the distant object as light spots on the image area of the detector 8. An imaging of objects situated in the distant field takes place on the detector 8 which is situated in the image plane or image area of the lens system 7. So that identical angular differences are imaged on picture elements of identical distances, a cylindrical or spherical image area is advantageous, as illustrated. This also permits a uniform image intensity distribution which corresponds to a maximal distance of the object which does not depend on the angle of incidence.

The lens system 8 of the detector unit 7, 8 may, for example, be of the double Gauss type, which performs an imaging onto a spherical or cylindrical image area while the luminous intensity is simultaneously high. This is illustrated in FIG. 5. A receiving lens system is thereby created which has high precision and luminous intensity, as required for a large range and a rapid scanning operation.

The beam path of the light reflected by the distant object leads in the direction of incidence in front of the detector unit 7, 8 by way of the same swivelling mirror 5 which is provided on the transmitter side for deflecting the parallel light beam 2 in the second vertical direction as a component of the scanning unit 4, 5. By means of the swivelling mirror 5, the direction of the light received by the detector unit 7, 8 on the receiver side is adapted to the direction of the light emitted on the transmitter side by the scanning unit 4, 5, so that, on the receiver side, light is always detected from the same vertical direction into which it has been emitted on the transmitter side. The vertical component of the transmitted and the received light beaming direction is identical, which is necessary because the reflected and observed light originates only from the illuminated object. As a result, the incident beaming directions vary only horizontally, so that a one-dimensional arrangement of the detector 8 is sufficient. The site-resolving detector 8 therefore detects the horizontal component of the direction from which the light reflected by the distant object is received; the vertical component can be derived from the angular position of the swivelling mirror 5.

Figure 3:
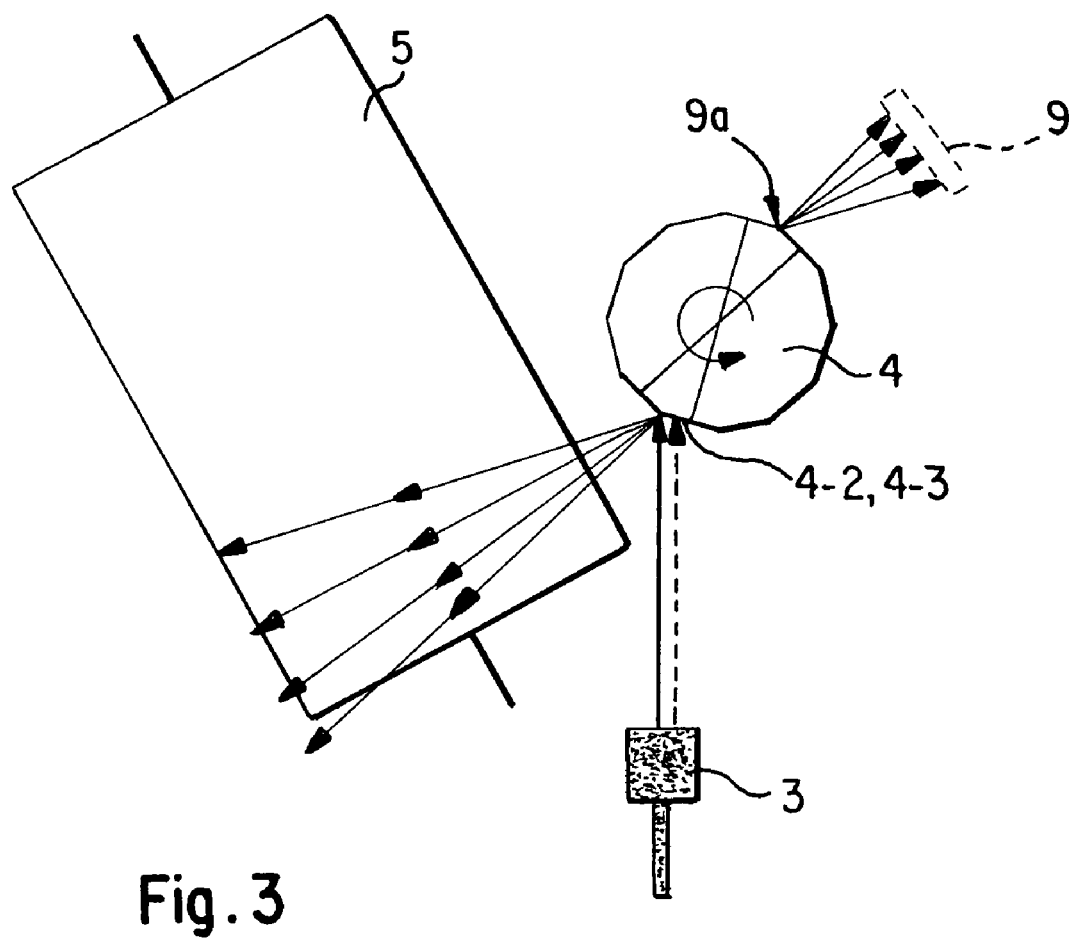
FIG. 3 is a schematic view of the essential components of the transmitter part of the system of the invention according to the embodiment of FIG. 1, for explaining the function of a scanning unit provided for deflecting a parallel light beam.

The light beam generating device is formed by the light source 1 and the beam position switching unit 3 for generating the parallel light beam 2 in two different beam positions which, in response to a rotating position indicating signal indicating the rotating position of the polygonal mirror 4, can be switched over from a partial mirror surface, for example, the partial mirror surface 4-2, to an adjacent partial mirror surface, for example, the partial mirror surface 4-3. The change-over of the parallel light beam 2 will always take place when, because of the progressing rotation of the polygonal mirror 4, the parallel light beam 2 is split by an edge situated between two adjacent partial mirror surfaces 4-1, 4-2, 4-3, . . . and thus starts to be reduced in its intensity. In this manner, the entire beam profile of the finitely expanded parallel light beam 2 always impinges on a single partial mirror surface of the polygonal mirror 4, as schematically illustrated in FIG. 3, and is therefore beamed into the intended direction with its total intensity.

The rotating position indicating signal, to which the beam position unit 3 switches over in response, is generated in the illustrated embodiment by an angle detector 9 which responds to the beam of a test laser 9a, such as a small ruby laser, reflected on a respective partial mirror surface of the polygonal mirror 4.

The beam position switching unit 3 according to an embodiment of the invention illustrated in FIGS. 4a) and b), successively in the beam path of a parallel light bundle generated by a fiber-optic system 31 and a collimator 32, contains a polarizer 33, 34, 35 for generating light polarized in a certain polarization condition from the light emitted by the light source 1. A Pockels cell 36, which is used for switching over the polarization condition of the light emitted by the polarizer 33, 34, 35 between a first polarization condition and a second polarization condition, is connected on the output side of the polarizer 33, 34, 35. A polarization beam splitter 37, 38, 39, 39' is, in turn, connected behind the Pockels cell 36, which polarization beam splitter 37, 38, 39, 39' is used for scattering the light having the first polarization condition in a first beam position (beam 1) and for scattering the light having the second polarization condition in a second beam position (beam 2). In the first beam position, the parallel light beam 2 impinges on the one partial mirror surface, here, the partial mirror surface 4-2; in the second beam position, the parallel light beam 2 impinges on the adjacent partial mirror surface, here the partial mirror surface 4-3 when the rotating position of the polygonal mirror 4 is just such that the parallel light beam 2 is split by the edge between the two adjacent partial mirror surfaces 4-2, 4-3 and thus starts to be weakened.

The polarizer 33, 34, 35 contains a polarization beam splitter 33 which splits the light received from the collimator 32 into two components, for example, an s-polarized component and a p-polarized component. While the p-polarized component passes through the polarization beam splitter 33 in a straight direction, the s-polarized component is scattered from the polarization beam splitter 33 and, parallel offset by a bending mirror 34, is placed back in the direction of the beam path in which a $\lambda/2$-plate 35 is situated by which its polarization direction is rotated so that finally a linearly p-polarized beam has been generated which has a doubled beam width.

In the Pockels cell 36 connected on the output side, the polarization condition of the light emitted by the polarizer 33, 34, 35, as a function of a high-voltage signal applied from the outside to the Pockels cell 36, is switched over selectively between the first polarization condition and the second polarization condition, so that the parallel light beam 2 is selectively scattered in the first beam position (beam 1) or in the second beam position (beam 2) by the polarization beam splitter 37, 38, 39, 39'.

$\lambda/4$-plates 39, 39' provided in each case in the two beam paths of the polarization beam splitters 37, 38, 39, 39' are used for causing a circular polarization of both beams 1, 2 independently of the previous s- or p-polarization.

While the invention has been described in connection with various embodiments, it will be understood that the invention is capable of further modifications. This application is intended to cover any variations, uses or adaptations of the invention following, in general, the principles of the invention, and including such departures from the present disclosure as known, within the known and customary practice within the art to which the invention pertains.

LIST OF REFERENCE NUMBERS

1 Light source
1a deflecting mirror
2 parallel light beam
3 beam position switching unit
31 optical fiber
32 collimator
33 second polarization beam splitter
34 bending mirror
35 $\lambda/2$-plate
36 Pockels cell
37 first polarization beam splitter
38 bending mirror
39 $\lambda/4$-plate
39' $\lambda/4$-plate
4 polygonal mirror
4-1 partial mirror surface
4-2 partial mirror surface
4-3 partial mirror surface
5 swivelling mirror
6 distant object
7 lens system
8 detector
9 angle detector
9a test laser
10 detection device

The invention claimed is:

1. A system for the optical detection of a distant object, the system comprising
   a light beam generating device which generates a parallel light beam;
   a scanning unit which generates a scan pattern by deflecting the parallel light beam over a defined angular range; and
   a detector unit which detects light reflected by the distant object,
   wherein the scanning unit includes a rotating polygonal mirror with several reflecting partial mirror surfaces, the light beam generating device generates a parallel light beam in two different beam positions which, in response to a rotating position indicating signal indicating the rotating position of the polygonal mirror, can be switched over from one partial mirror surface to an adjacent partial mirror surface.

2. The system according to claim 1, wherein the two different beam positions are mutually offset in parallel.

3. The system according to claim 1, wherein the light beam generating device includes two light sources which generate the parallel light beam in the two different beam positions.

4. A system for the optical detection of a distant object, the system comprising
   a light beam generating device which generates a parallel light beam;
   a scanning unit which generates a scan pattern by deflecting the parallel light beam over a defined angular range; and
   a detector unit which detects light reflected by the distant object, wherein the scanning unit includes a rotating polygonal mirror with several reflecting partial mirror surfaces, the light beam generating device generates a parallel light beam in two different beam positions which, in response to a rotating position indicating signal indicating the rotating position of the polygonal mirror, can be switched over from one partial mirror surface to an adjacent partial mirror surface, wherein the light beam generating device includes a light source, and a beam position switching unit is between the light source and the scanning unit, the beam switching unit switches over the beam position of the parallel light beam from one partial mirror surface to an adjacent partial mirror surface in response to the rotating position indicating signal indicating the rotating position of the polygonal mirror.

5. The system according to claim 4, wherein the beam position switching unit has, successively arranged in the beam path, a polarizer which generates polarized light of a defined polarization condition from the light emitted by the light source, a Pockels cell which switches over the polarization condition of the light emitted by the polarizer between a first polarization condition and a second polarization condition, and a first polarization beam splitter which scatters the light having the first polarization condition in a first beam position in which the parallel light beam impinges on the one partial mirror surface, and which scatters the light having the second polarization condition in a second beam position, in which the parallel light beam impinges on the adjacent partial mirror surface.

6. The system according to claim 5, wherein the polarizer includes a second polarization beam splitter with a λ/2-plate connected on the output side, which generates the polarized light of the one defined polarization condition.

7. The system according to claim 5, wherein the first polarization beam splitter in each case contains includes a λ/4-plate in the beam path of the light having the first polarization condition and in the beam path of the light having the second polarization condition which generates the parallel light beam with circularly polarized light.

8. The system according to claim 1, wherein the scanning unit includes the rotating polygonal mirror which deflects the parallel light beam in a first direction and includes a swivelling mirror in the beam path which deflects the parallel light beam in a second direction.

9. A system for the optical detection of a distant object, the system comprising
a light beam generating device which generates a parallel light beam;
a scanning unit which generates a scan pattern by deflecting the parallel light beam over a defined angular range; and
a detector unit which detects light reflected by the distant object,
wherein the scanning unit includes a rotating polygonal mirror with several reflecting partial mirror surfaces, the light beam generating device generates a parallel light beam in two different beam positions which, in response to a rotating position indicating signal indicating the rotating position of the polygonal mirror, can be switched over from one partial mirror surface to an adjacent partial mirror surface,
wherein the scanning unit includes the rotating polygonal mirror which deflects the parallel light beam in a first direction and includes a swivelling mirror in the beam path which deflects the parallel light beam in a second direction, and
wherein the polygonal mirror deflects the parallel light beam in the horizontal direction, and the swivelling mirror deflects the parallel light beam in the vertical direction.

10. The system according to claim 1, wherein the detector unit includes a detector and a lens system which images the light reflected by the distant object on the detector.

11. The system according to claim 10, wherein the detector is a site-resolving detector.

12. The system according to claim 11, wherein the detector is a one-dimensional detector.

13. The system according to claim 11, wherein the detector has a spherical or cylindrical image surface.

14. A system for the optical detection of a distant object, the system comprising
a light beam generating device which generates a parallel light beam;
a scanning unit which generates a scan pattern by deflecting the parallel light beam over a defined angular range; and
a detector unit which detects light reflected by the distant object,
wherein the scanning unit includes a rotating polygonal mirror with several reflecting partial mirror surfaces, the light beam generating device generates a parallel light beam in two different beam positions which, in response to a rotating position indicating signal indicating the rotating position of the polygonal mirror, can be switched over from one partial mirror surface to an adjacent partial mirror surface,
wherein the detector unit includes a detector and a lens system which images the light reflected by the distant object on the detector,
wherein the detector is a site-resolving detector,
wherein the detector is a one-dimensional detector, and
wherein a swivelling mirror which adapts the direction of the light received by the detector unit to the direction of the light emitted by the scanning unit is in the beam path of the light reflected by the distant object in front of the detection unit.

15. The system according to claim 14, wherein the swivelling mirror which adapts the direction of the light received by the detector unit to the direction of the light emitted by the scanning unit is the same swivelling mirror which is provided for deflects the parallel light beam in the second direction.

16. The system according to claim 1, wherein the lens system of the detector unit is a double Gauss type lens system.

17. A method for monitoring the air space situated in the flight direction in front of an aircraft for poorly recognizable obstacles, the method comprising the acts of:
generating, by a light beam generating device, a parallel light beam in a first beam position;
generating, by a scanning unit that includes a rotating polygonal mirror with several reflecting partial mirror surfaces, a scan pattern by deflecting the parallel light beam over a defined angular range
generating, by the light beam generating device in response to a rotating position indicating signal indicating the rotating position of the polygonal mirror, a parallel light beam in a second beam position that switches over from one partial mirror surface of the first beam position to an adjacent partial mirror surface; and
detecting, by a detector unit, light reflected by the distant object.

* * * * *